United States Patent [19]
Ritz

[11] Patent Number: 5,301,300
[45] Date of Patent: Apr. 5, 1994

[54] FLOPPY DISK DRIVE CONTROLLER WITH IMPROVED DENSITY SELECT

[75] Inventor: Terry G. Ritz, New Branfels, Tex.

[73] Assignee: Advanced Micro Devices, Inc., Sunnyvale, Calif.

[21] Appl. No.: 64,343

[22] Filed: May 20, 1993

Related U.S. Application Data

[63] Continuation of Ser. No. 655,654, Feb. 14, 1991, abandoned.

[51] Int. Cl.$^5$ ............................................. G06F 3/00
[52] U.S. Cl. .................... 395/425; 364/DIG. 1; 364/231.5; 364/236.2; 364/238.3; 364/239.1; 364/239.3; 364/245.6; 364/245.7; 364/248.1; 364/260; 364/260.1; 360/48
[58] Field of Search ............... 395/425, 325, 275, 700; 360/48, 69, 51

[56] References Cited

U.S. PATENT DOCUMENTS

| | | | |
|---|---|---|---|
| 4,494,196 | 1/1985 | Greer | 395/275 |
| 4,571,674 | 2/1986 | Hartung | 395/250 |
| 4,651,238 | 3/1987 | Ishikura | 360/48 |
| 4,724,493 | 2/1988 | Nakamura | 360/51 |
| 4,773,036 | 9/1988 | Berens et al. | 395/425 |
| 4,811,280 | 3/1989 | Berkowitz et al. | 395/425 |
| 4,858,038 | 8/1989 | Kazama | 360/69 |
| 4,872,107 | 10/1989 | Marple et al. | 395/700 |
| 4,928,192 | 5/1990 | Bartlett et al. | 360/77.08 |
| 4,928,193 | 5/1990 | Agoglia | 360/78.04 |
| 5,014,237 | 5/1991 | Masters et al. | 395/500 |
| 5,130,863 | 7/1992 | Yamashita et al. | 360/48 |
| 5,142,626 | 8/1992 | Arnold et al. | 395/275 |

Primary Examiner—Michael R. Fleming
Assistant Examiner—Ayaz R. Sheikh
Attorney, Agent, or Firm—Foley & Lardner

[57] ABSTRACT

A floppy disk drive controller interfaces a microprocessor system including a microprocessor with a floppy disk drive of the type arranged to receive data bits at any one of 250 or 300 Kbps, 500 Kbps, and 1 Mbps rates. The controller is arranged for providing data bits for the floppy disk drive at a rate corresponding to one of the three rates. The controller conditions the floppy disk drive to receive the data bits at the one rate dictated by the microprocessor and includes a data rate control register for providing a pair of data rate control bits indicative of the one data rate and a decoder coupled to the control register for decoding the data rate control bits and providing a pair of rate control signals to condition the floppy disk drive to receive the data bits at the one data rate. The controller also includes data rate control redundancy for conditioning the floppy disk drive responsive to data rate control signals received directly from the microprocessor.

20 Claims, 1 Drawing Sheet

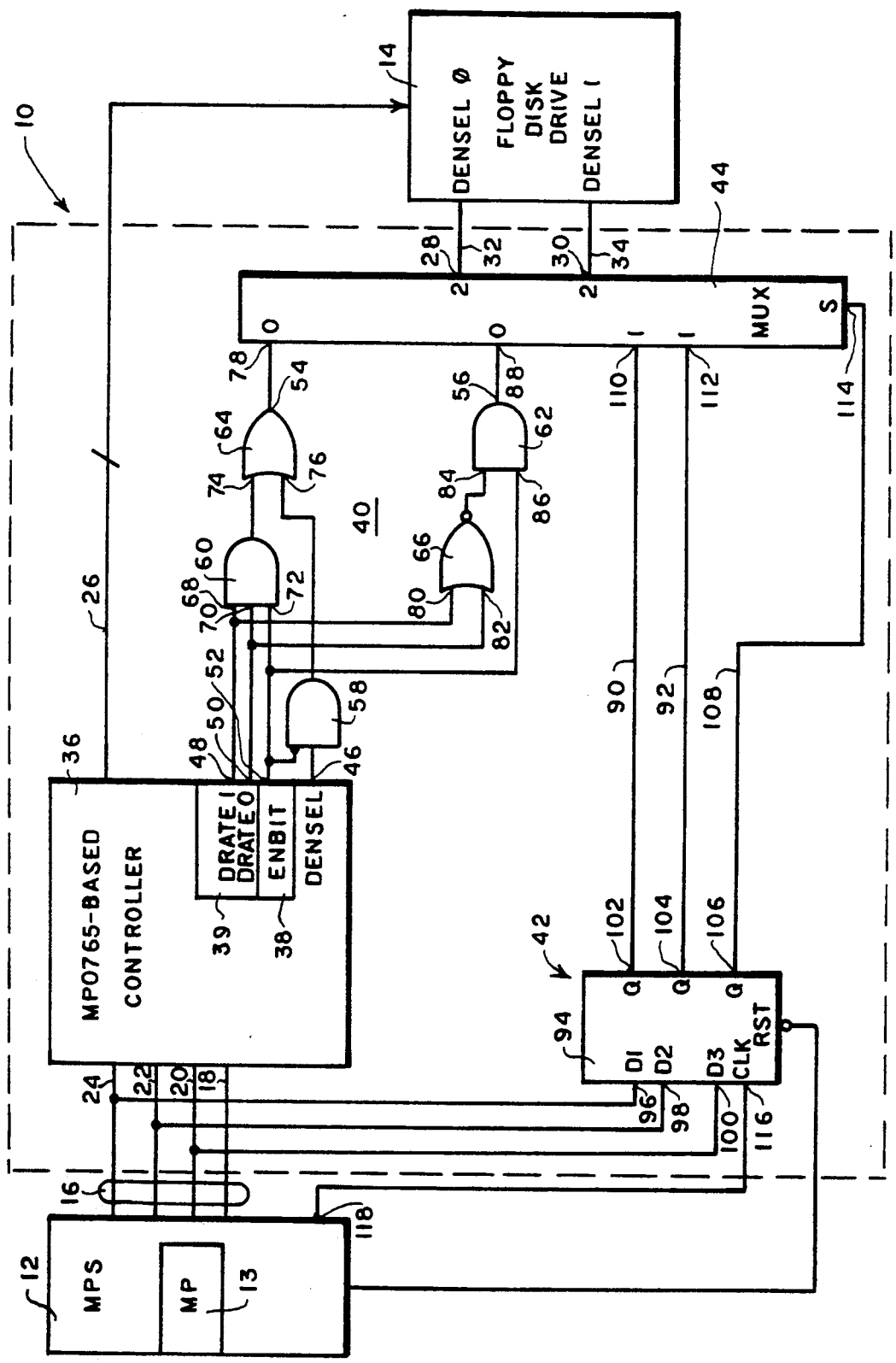

FLOPPY DISK DRIVE CONTROLLER WITH IMPROVED DENSITY SELECT

This is a continuation of application Ser. No.07/655,654 filed Feb. 14, 1991, now abandoned.

BACKGROUND OF THE INVENTION

The present invention generally relates to a floppy disk drive controller for interfacing a microprocessor system with a floppy disk drive. The present invention more particularly relates to such a floppy disk drive controller having an improved density select for use with a floppy disk drive of the type capable of receiving data bits having at least three different data rates, for providing the floppy disk drive with rate control signals to condition the floppy disk drive to receive the data bits from the floppy disk drive controller at one of the at least three different data rates. The floppy disk drive controller of the present invention is also compatible with floppy disk drives capable of receiving data bits at two different rates and further includes a rate controller for receiving data rate control signals directly from the microprocessor to provide data rate control redundancy.

Computer systems generally employ a microprocessor having internal and/or external memory. To interface the microprocessor system to a floppy disk drive, such systems also generally include a floppy disk drive controller. Such controllers are utilized to convert parallel-bits of data from the microprocessor system to serial-bits of data and to provide the floppy disk drive with the serial-bits of data. Along with the serial-bits of data, the floppy disk drive controllers provide the floppy disk drives with various control signals, well known in the art, including density select or data rate control signals to condition the floppy disk drives to receive the serial-bits of data from the floppy disk drive controllers at a rate dictated by the microprocessors.

Floppy disk drives which have been commonly used in the past have been capable of receiving the data bits at two different rates, five hundred kilobits per second (500 Kbps) and two hundred and fifty kilobits per second (250 Kbps) or three hundred Kilobits per second (300 Kbps). Floppy disk drive controllers used in conjunction with such floppy disk drives have provided a single rate control signal, commonly referred to in the art as a density select signal (DENSEL), having one of two levels responsive to commands from the microprocessor for conditioning the floppy disk drives to receive the data bits at one of these two different rates. A high level of the single data rate control signal has conditioned the floppy disk drives to receive the microprocessor data bits at the 500 Kbps rate and a low level of the single data rate control signal has conditioned the floppy disk drives to receive the microprocessor data bits at the 250 Kbps or 300 Kbps rate.

Improved floppy disk drives known as extended floppy disk drives are not only arranged to receive microprocessor data bits at the 500 Kbps and 250 Kbps or 300 Kbps rates, but also at a one megabit rate (1 Mbps). Unfortunately, floppy disk drive controllers have not been able to accommodate these improved floppy disk drives because they have not provided the necessary data rate control signals to activate the 1 Mbps rate of such floppy disk drives.

The floppy disk drive controller of the present invention overcomes this deficiency in prior art floppy disk drive controllers by providing the necessary rate control signals for conditioning the improved floppy disk drives to receive microprocessor data bits at any one of the three data rates of 300 Kbps or 250 Kbps, 500 Kbps, and 1 Mbps. In addition, as will be seen hereinafter, the floppy disk drive controller of the present invention is also capable of providing a single data rate control signal for conditioning the first mentioned floppy disk drives to receive microprocessor data bits at either the 250 or 300 Kbps or 500 Kbps data rates so as to be compatible therewith. The floppy disk drive controller of the present invention also includes a separate data rate control adapted to receive data rate control signals directly from the microprocessor to provide system data rate control redundancy.

SUMMARY OF THE INVENTION

The present invention therefore provides a floppy disk drive controller for interfacing a microprocessor system including a microprocessor with a floppy disk drive of the type arranged to receive data bits at any one of at least three different rates, wherein the controller is arranged for providing data bits for the floppy disk drive at any one of the at least three different rates. The controller includes means for providing data rate control signals to the floppy disk drive for conditioning the floppy disk drive to receive the data bits at the one rate and includes a control register for providing a plurality of data rate control bits indicative of one of the data rates, wherein the control register is arranged to receive the data rate control bits from the microprocessor. The controller further includes decoding means coupled to the control register and including a pair of outputs arranged to be coupled to the floppy disk drive for decoding the data rate control bits and providing a first set of the data rate control signals to the floppy disk drive for conditioning the floppy disk drive to receive the data bits at the one data rate.

The present invention further provides a floppy disk controller for interfacing a microprocessor system including a microprocessor with a floppy disk drive of the type arranged to receive data bits at any one of first, second and third rates, wherein the controller is arranged for providing data bits for the floppy disk drive at any one of the first, second or third data rates. The controller includes means for conditioning the floppy disk drive to receive the data bits at any one of the rates and includes control means for providing a plurality of data rate control bits indicative of the any one data rate and an enable bit, and decoding means coupled to the control means and including a pair of outputs arranged to be coupled to the floppy disk drive. The decoding means is responsive to the enable bit for decoding the data rate control bits and providing a pair of data rate control signals to the outputs for conditioning the floppy disk drive to receive the data bits at the any one data rate.

BRIEF DESCRIPTION OF THE DRAWING

The features of the present invention which are believed to be novel are set forth with particularity in the appended claims. The invention, together with further objects and advantages thereof, may best be understood by making reference to the following description take in conjunction with the accompanying drawing, in the sole FIGURE of which like reference numerals identify identical elements, and wherein the sole FIGURE is a schematic circuit diagram of a floppy disk drive controller embodying the present invention illustrated in operative relation with a microprocessor and a floppy disk drive for interfacing the microprocessor with the floppy disk drive.

DETAILED DESCRIPTION OF THE PREFERRED EMBODIMENT

Referring now to the sole FIGURE, it illustrates a floppy disk drive controller 10 embodying the present invention and of the type arranged to interface the microprocessor system (MPS) 12 to a floppy disk drive 14. The floppy disk drive controller 10 is arranged to be coupled to the microprocessor system 12 by an 8-bit data bus 16 for which bus conductors 18, 20, 22 and 24 are illustrated in the FIGURE. Each conductor of the data bus 16 corresponds to one of the bits of the data bus with conductor 18 corresponding to bit 0, conductor 20 corresponding to bit 5, conductor 22 corresponding to bit 6, and conductor 24 corresponding to bit 7.

The controller 10, as well known in the art, serializes the data bits received from the microprocessor system 12 and conveys the serialized bits of data along with various control signals of the type well known in the art to the floppy disk drive 14 over a multiple-bit parallel bus 26. Another function of the floppy disk drive controller 10 is to condition the floppy disk drive 14 for receiving the serialized data bits at one data rate of a plurality of data rates. Microprocessors of microprocessor systems, such as microprocessor 13 of system 12, may be selectively arranged to require the floppy disk drive controller 10 to provide data to the floppy disk drive 14 over the bus 26 at one of three serial data bit rates of 250 or 300 Kbps, 500 Kbps and 1 Mbps. Responsive to commands from the microprocessor 13 relating to the selected data rate, the controller 10 is arranged to condition the floppy disk drive 14 for receiving the serial data bits at the rate dictated by the microprocessor 13.

To that end, the controller 10 includes a pair of outputs 28 and 30 which provide rate control signals, with each rate control signal having one level of two different levels. The outputs 28 and 30 may be coupled to the floppy disk drive 14 over a first density select control line 32 coupled to output 28 and a second density select control line 34 coupled to output 30. As will be seen hereinafter, if the floppy disk drive 14 is of the type arranged to receive the data bits at either the 250 or 300 Kbps and 500 Kbps data rates, it would be coupled to the controller 10 by only the first density select control line 32. Alternatively, if the floppy disk drive 14 is of the type which is capable of receiving the data bits at all three rates, it would be coupled to the controller 10 by both the first density select control line 32 and the second density select control line 34.

The controller 10 generally includes a uPD 765 or 765 based controller circuit 36 of the type well known in the art, a configuration control register 38, a data rate control register 39, a decoding means 40, a rate control means 42, and a multiplexer 44. The 765 based controller circuitry, as well known in the art, provides the parallel-to-serial conversion of the data bits from the microprocessor system 12 and also the control signals conveyed over the multiple-bit bus 26. For purposes of compatibility, the microprocessor 13 of system 12 is preferably a 80×86-based microprocessor of the type well known in the art.

The controller circuitry 36, as well known in the art, is arranged to provide a single rate control signal from an output 46 which is either a logical one or a logical zero level for conditioning the first mentioned type of floppy disk drive to receive the data bits at either one of the 250 or 300 Kbps and the 500 Kbps rates. If the output 46 is a logical one, the floppy disk drive 14 is conditioned to receive the data bits at the 500 Kbps rate and if the output is a logical zero, the floppy disk drive is conditioned to received the data bits at the 250 or 300 Kbps rate. As will be seen hereinafter, if the floppy disk drive 14 is of the type arranged to receive the data bits at either one of the 250 or 300 Kbps and 500 Kbps rates, the controller 10, for purposes of compatibility, will provide the single rate control signal to the floppy disk drive.

For conditioning a floppy disk drive of the second mentioned type, the data rate control register 39 provides first and second data rate control bits at outputs 48 and 50 indicative of the data rate dictated by the microprocessor 13 of system 12. Also, when a floppy disk drive being interfaced to the microprocessor system 12 is of the second mentioned type wherein it is capable of receiving data bits at any one of three rates, the configuration control register 38 provides at another output 52 an enable bit which enables the decoding means 40 to decode the rate control bits at outputs 48 and 50 to provide a pair of rate control signals at the decoding means outputs 54 and 56 in a manner to be described hereinafter. The data rate bits provided by the data rate control register 39 at outputs 48 and 50 may have one of two different levels, a logical one or a logical zero.

The configuration control register 38 is arranged to receive the level of the enable bit and the data rate control register 39 is arranged to receive the data rate bits from the microprocessor 13 of the system 12 over the data bus 16. The enable bit at output 52 is set over the bit 5 conductor 20, the data rate 0 bit at output 50 is set over the bit 6 conductor 22, and the data rate 1 bit at output 48 is set over the bit 7 conductor 24. As will be appreciated by those skilled in the art, not shown in the FIGURE is a multiple-bit address bus and associated control from the microprocessor to the controller 10 for addressing the configuration and rate control registers 38 and 39. As contemplated by this preferred embodiment, and as is conventional in the art, the configuration and rate control registers 38 and 39 are preferably assigned a unique multiple-bit address to permit the microprocessor to individually address the configuration and rate control registers 38 and 39 for setting the enable and rate control bits.

The decoding means 40 generally includes AND gates 58, 60 and 62, OR gate 64, and NOR gate 66. AND gate 60 includes an input 68 which is coupled to the output 48 of the rate control register 39 for receiving the level of the data rate 1 bit. AND gate 60 includes another input 70 which is coupled to output 50 of the rate control register 39 for receiving the level of the data rate 0 bit. AND gate 60 includes a third input 72 coupled to output 52 of the configuration control register 38 for receiving the level of the enable bit.

AND gate 58 has an inverting input which is coupled to the output 52 of the configuration control register 38 and a non-inverting input coupled to the output 46 of the 765-based controller circuit for receiving the single rate control signal. The outputs of AND gates 60 and 58 are coupled to the inputs 74 and 76 of OR gate 64. The output 54 of OR gate 64 comprises the first output of the decoding means 40 and is coupled to an input 78 of multiplexer 44.

NOR gate 66 includes a first input 80 which is coupled to the output 48 of the rate control register 39 and another input 82 which is coupled to the output 50 of the rate control register 39 for receiving the levels of the data rate 1 and data rate 0 bits respectively of the rate control register 39. The output of NOR gate 66 is coupled to one input 84 of AND gate 62. The other input 86 of AND gate 62 is coupled to output 52 of the configuration control register 38 for receiving the level of the enable bit. The output 56 of AND gate 62 comprises the second output of the decoding means 40 and is coupled to an input 88 of the multiplexer 44.

If the floppy disk drive 14 is of the type capable of receiving data bits at any one of the three data bit rates including the 250 or 300 Kbps, 500 Kbps and 1 Mbps data rates, the enable bit of the configuration control register 38 will be set to a logical one by the microprocessor and the multiplexer 44 will be in a default condition for coupling input 78 to output 28 and input 88 to output 30. Also, the first density select control line 32 couples the output 28 of multiplexer 44 to the floppy disk drive and the second density select control line 34 couples the output 30 of multiplexer 44 to the floppy disk drive 14.

If the data rate dictated by the microprocessor 13 of system 12 is a 250 or 300 Kbps rate, the microprocessor will set the data rate 1 bit to a logical one and the data rate 0 bit to a logical zero for the 250 Kbps rate or will set the data rate 1 bit to a logical zero and the data rate 0 bit to a logical one for the 300 Kbps rate. Because either input 68 or input 70 of AND gate 60 is at a logical zero, the output of AND gate 60 will provide the input 74 of OR gate 64 with a logical zero. The output of AND gate 58 will also provide the input 76 of OR gate 64 with a logical zero. Since both inputs 74 and 76 of OR gate 64 are at a logical zero, the decoding means at the first output 54 will provide the input 78 of multiplexer 44 with a logical zero level.

Either input 80 of NOR gate 66 or input 82 of NOR gate 66 will be at a logical one. This causes the NOR gate 66 to provide the input 84 of AND gate 62 with a logical zero. This in turn causes the output 56 of AND gate 62 to be at a logical zero which is conveyed to input 88 of multiplexer 44. As a result, the rate control signals at inputs 78 and 88 of multiplexer 44 are both at a logical zero level, and these levels are conveyed to the floppy disk drive 14 from the outputs 28 and 30 of the multiplexer 44 over the density select control lines 32 and 34. These rate control signals condition the floppy disk drive 14 for receiving the data bits at a rate corresponding to the 250 or 300 Kbps rate.

If the data rate dictated by the microprocessor of system 12 is the 500 Kbps rate, it will cause both the data rate 0 and data rate 1 bits to be at a logical zero level Inputs 68 and 70 of AND gate 60 will thus be at a logical zero to provide a logical zero level to input 74 of OR gate 64. AND gate 58 will continue to provide a logical zero level to input 76 of OR gate 64. As a result, the first output 54 of the decoding means 40 will be at a logical zero level. Inputs 80 and 82 of NOR gate 66 will also be at a logical zero level to cause the NOR gate 66 to provide a logical one level to the input 84 of AND gate 62. Input 86 of AND gate 62 will be at a logical one by the enable bit to provide a logical one at the second output 56 of the decoding means 40. The inputs 78 and 88 of multiplexer 44 will, as a result, be at a logical zero and a logical one respectively. These rate control signals are conveyed to the floppy disk drive 14 from the outputs 28 and 30 over the density select control lines 32 and 34 to condition the floppy disk drive 14 to receive the data bits at the 500 Kbps rate.

Lastly, if the data rate dictated by the microprocessor 13 of system 12 is the 1 Mbps data rate, it will set both the data rate 0 and data rate 1 bits of the data rate control register 39 to a logical one. All three inputs of AND gate 60 will thus be at a logical one to provide a logical one at input 74 of OR gate 64. This causes the first output 54 of the decoding means 40 to be a logical one which is impressed upon input 78 of multiplexer 44. The inputs 80 and 82 of NOR gate 66 will also be at a logical one to cause the output of NOR gate 66 to provide the input 84 of AND gate 62 with a logical zero. This causes the second output 56 of the decoding means 40 to be at a logical zero and this level is conveyed to the input 88 of the multiplexer 44. As a result, the floppy disk drive 14 is provided with a logical one over the first density select control line 32 and a logical zero over the second density select line 34 for conditioning the floppy disk drive 14 to receive the data bits at the 1 Mbps rate.

When the floppy disk drive 14 is of the type which is arranged to receive data bits at either one of the 250 or 300 Kbps and 500 Kbps data rates, the microprocessor 13 of system 12 will set the enable bit of the data rate control register 38 to a logical zero. The logical zero at output 52 of the data rate control register 38 disables the AND gates 60 and 62 from decoding the data rate 0 and data rate 1 data rate control register bits. Since output 52 is coupled to the inverting input of AND gate 58, AND gate 58 is arranged to convey the level of the single rate control signal from output 46 to the input 76 of OR gate 64 and OR gate 64 is arranged to convey that same level to the first output 54 of the decoding means 40 to the input 78 of multiplexer 44. As a result, AND gates 58 and 62 and the input 72 of AND gate 60 form an enabling means to enable the decoding means 40 to decode the data rate 0 and data rate 1 bits when the enable bit is set to a logical one and to disable the decoding means 40 from decoding those bits when the enable bit is a logical zero.

When the data rate dictated by the microprocessor 13 of system 12 is the 500 Kbps rate, the output 46 will be at a logical one and this level is conveyed through the decoding means 40 without decoding to the first density select control line 32. This conditions the floppy disk drive to receive the data bits at the 500 Kbps rate. When the data rate dictated by the microprocessor 13 of system 12 is the 250 or 300 Kbps rate, the output 46 will be a logical zero. This level is also conveyed through the decoding means 40 without decoding to the first density select line 32 for conditioning the floppy disk drive 14 to receive the data bits at the 250 or 300 Kbps rate. As a result, the controller 10 of the present invention provides compatibility for those floppy disk drives which are capable of receiving data bits at either one of the 250 or 300 Kbps and 500 Kbps rates.

To provide data rate control redundancy, the controller 10 includes the data rate control means 42 which is arranged to provide a second set of data rate control signals over lines 90 and 92. The data rate control means 42 comprises a latch 94 having a first input 96 coupled to the data bus conductor 24 corresponding to bit 7 of the data bus 16 and another input 98 which is coupled to data bus conductor 22 corresponding to bit 6 of the data bus 16. The latch 94 includes a further input 100 which is coupled to conductor 20 which corresponds to bit 5 of the data bus 16.

The latch 94 further includes an output 102 coupled to line 90, an output 104 coupled to line 92, and output 106 coupled to line 108. Line 90 is coupled to input 110 of multiplexer 44, line 92 is coupled to input 112 of multiplexer 44 and line 108 is coupled to the select input 114 of multiplexer 44.

When the redundancy of latch 94 is to be utilized, the microprocessor 13 of system 12 will set the input 100 of latch 94 to a logical one. The latch 94 includes a clock input 116 which is coupled to a clock output 118 of the microprocessor from which it receives a clock signal input for conveying the logical one at input 100 to output 106 and thus to the select input 114 over line 108. This causes the multiplexer to selectively couple the outputs 102 and 104 of latch 94 to the outputs 28 and 30 and thus to the first and second density select control lines 32 and 34 respectively.

The redundancy is provided for conditioning a floppy disk drive of the type capable of receiving data bits at any one of three data rates. If the data rate dictated by the microprocessor 13 is a 250 or 300 Kbps rate, the microprocessor 13 will set inputs 96 and 98 of latch 94 to the logical zero level and input 100 to a logical one. When the microprocessor provides the clock signal to the clock input 116, the logical zero levels are conveyed to the inputs 110 and 112 of the multiplexer 44 and the logical one level is conveyed to the select input 114. This causes the logical zero levels to be conveyed to the first and second density select control lines 32 and 34 for conditioning the floppy disk drive to receive the data bits at the 250 Kbps rate.

When the data rate dictated by the microprocessor 13 is the 500 Kbps rate, it will set input 96 to a logical zero, input 98 to a logical one and input 100 to a logical one. Upon receipt of a clock signal from the microprocessor, the latch 94 conveys the logical zero level to input 110 of multiplexer 44 and the logical one level to input 112 of multiplexer 44. Because the select input 114 is at a logical one, the first density select control line will receive the logical zero level and the second density select control line 34 will receive the logical one level. These data rate control signal levels will cause the floppy disk drive 14 to be conditioned for receiving the data bits at the 500 Kbps rate.

Lastly, if the data rate dictated by the microprocessor 13 is the 1 Mbps rate, the microprocessor 13 will set input 96 to a logical one, input 98 to a logical zero, and input 100 again to a logical one. These levels are shifted to the outputs of the latch 94 upon the receipt of a clock pulse at input 116 so that the first density select control line 32 will receive a logical one and the second density select control line 34 will receive a logical zero. These data rate control signal levels will cause the floppy disk drive 14 to be conditioned for receiving the data bits at the 1 Mbps rate.

As a result from the foregoing, it can be seen that the data rate control means 42 provides date rate control redundancy for a floppy disk drive of the type capable of receiving data bits at any one of the three aforementioned rates. The latch 94 is arranged to provide a second set of data rate control signals over the lines 90 and 92 based upon rate control signals received directly from the microprocessor 13.

While a particular embodiment of the present invention has been shown and described, modifications may be made, and it is therefore intended to cover in the appended claims all such changes and modifications which fall within the true spirit and scope of the invention.

What is claimed is:

1. A floppy disk drive controller for interfacing a microprocessor system including a microprocessor with a floppy disk drive of a first type arranged to receive data bits at any one of first, second and third rates and with a floppy disk drive of a second type arranged to receive data bits only at said first and second rates, wherein said first rate is substantially equal to 250 or 300 kilobits per second, said second rate is substantially equal to 500 kilobits per second, and said third rate is substantially equal to 1 megabit per second, wherein said controller is arranged for providing data bits for said floppy disk drive at one rate of said first, second and third data rates, said controller comprising:

control means responsive to a data rate indication provided by said microprocessor system for providing a plurality of data rate control bits indicative of said one data rate and an enable bit; and decoding means coupled to said control means and including a pair of outputs arranged to be coupled to said floppy disk drive and responsive to said enable bit for decoding said configuration data rate control bits and providing a pair of data rate control signals to said output for conditioning said floppy disk drive to receive said data bits at any one of said first, second, and third data rates.

2. A floppy disk drive controller as defined in claim 1 wherein said control means comprise first and second storage registers for receiving said data rate indication.

3. A floppy disk drive controller as defined in claim 2 wherein said plurality of data rate control bits comprise two bits, said rate control bits each having a first or second level.

4. A floppy disk drive controller as defined in claim 1 wherein one of said outputs is arranged to be coupled to said second type floppy disk drive, wherein said floppy disk drive controller includes means for providing a single rate control signal having a first level corresponding to said first rate and a second level corresponding to said second rate, and wherein said decoding means is responsive to said enable bit for conveying said single rate control signal to said one output without decoding for conditioning said second type floppy disk drive to receive said data bits at either one of said first and second data rates.

5. A floppy disk drive controller as defined in claim 4 wherein said decoding means is responsive to said enable bit being a logical one for decoding said rate control bits and to said enable bit being a logical zero for conveying said single rate control signal without decoding.

6. A floppy disk drive controller as defined in claim 5 wherein said control means comprises a storage register and wherein said rate control bits comprise a first and second bit of said storage register, said data rate control bits each having a first or second level.

7. A floppy disk drive controller as defined in claim 5 wherein said control means include a configuration register and wherein said decoding means includes enable means coupled to said configuration register for receiving said enable bit.

8. A floppy disk drive controller as defined in claim 7 wherein said enable means comprises first and second AND gates, each said AND gate having an input coupled to said configuration register for receiving said enable bit.

9. A floppy disk drive controller as define in claim 5 wherein said floppy disk drive controller is arranged to be coupled to said microprocessor by a data bus and wherein said configuration register is arranged to receive said data rate control and enable bits from said microprocessor over said data bus.

10. A floppy disk drive controller as defined in claim 9 further comprising rate control means having first and second inputs coupled to said data bus for receiving a second pair of data rate control signals from said microprocessor and a third input coupled to said data bus for receiving a select signal from sad microprocessor, said rate control means further including first and second outputs arranged to be coupled to said floppy disk drive for providing said floppy disk drive with said second pair of rate control signals responsive to said select signals.

11. A floppy disk drive controller as defined in claim 10 further including a multiplexer for selectively coupling said decoding means outputs or said rate control means outputs to said floppy disk drive controller in response to said select signal.

12. A floppy disk drive controller as defined in claim 11 wherein said rate control means comprises a latch including a third output coupled to said multiplexer for providing said multiplexer with said select signal.

13. A floppy disk drive controller as defined in claim 12 wherein said latch includes a clock input arranged to be coupled to said microprocessor for receiving a clock signal from said microprocessor, and wherein said latch is arranged to convey said second pair of rate control signals and said select signal to said multiplexer in response to receiving a clock signal from said microprocessor.

14. A floppy disk drive controller for interfacing a microprocessor system including a microprocessor with a floppy disk drive of a first type arranged to receive data bits at one of at least three different rates including a first rate substantially equal to 300 or 250 kilobits per second, a second rate substantially equal to 500 kilobits per second, and a third rate substantially equal to 1 megabit per second and with a floppy disk drive of a second type arranged to receive data bits only at said first and said second rate, wherein said floppy disk drive controller is arranged for providing data bits for said floppy disk drive at any one of said rates, said floppy disk drive controller including means for providing data rate control signals to said floppy disk drive for conditioning said floppy disk drive to receive said data bits at any one of said rates and comprising:

a control register for providing a plurality of data rate control bits indicative of one of said data rates, wherein said control register is arranged to receive said data rate control bits from said microprocessor; and decoding means coupled to said control register and including a pair of outputs arranged to be coupled to said floppy disk drive for decoding said configuration data rate control bits and providing a first set of said data rate control signals to said floppy disk drive for conditioning said floppy disk drive to receive said data bits at said one data rate.

15. A floppy disk drive controller as defined in claim 14 further including a configuration register, wherein said configuration register is arranged to provide an enable bit having a first or second level, wherein said decoding means further includes enable means coupled to said configuration register for receiving said enable bit and wherein said enable means is arranged to enable said decoding means to decode said data rate control bits responsive to one of said enable bit levels.

16. A floppy disk drive controller as defined in claim 15 wherein one of said outputs of said decoding means is adapted to be coupled to said second type floppy disk drive, wherein said floppy disk drive controller includes means for providing a single rate control signal having a first level corresponding to said first rate and a second level corresponding to said second rate, and wherein said enable means is responsive to the other said level of said enable bit to cause said decoding means to convey said single rate control signal to said one output without decoding for conditioning said floppy disk drive to receive said data bits at either said first and second rate.

17. A floppy disk drive controller as defined in claim 14 further comprising rate control means for providing said floppy disk drive with a second set of said data rate control signals.

18. A floppy disk drive controller as defined in claim 17 wherein said floppy disk drive controller is arranged to be coupled to said microprocessor by a multiple-bit bus, wherein said control register is arranged to receive said rate control bits from said microprocessor over said bus, and wherein said rate control means is coupled to said bus for receiving said second set of data rate control signals from said microprocessor.

19. A floppy disk drive controller as defined in claim 18 further comprising a multiplexer for selectively coupling said decoding means or said rate control means to said floppy disk drive.

20. A floppy disk drive controller as defined in claim 19 wherein said multiplexer is responsive to said microprocessor for selectively coupling said decoding means or said rate control means to said floppy disk drive.

* * * * *